Patented Feb. 14, 1939

2,146,732

UNITED STATES PATENT OFFICE 2,146,732

METHOD OF DRILLING WELLS

John J. Grebe and Leonard C. Chamberlain, Midland, Mich., assignors to The Dow Chemical Company, Midland, Mich., a corporation of Michigan No Drawing. Application October 30, 1937, Serial No. 171,914

10 Claims. (Cl. 255—1)

The invention relates to methods of drilling deep wells. It more particularly concerns an improved method of drilling into or through an acid-soluble oil or gas productive stratum.

In drilling for oil or gas by conventional methods employing rotary tools, it has been proposed to drill down to the productive formation using the usual drilling mud which is circulated in the bore to remove the cuttings, and when the drill is about to enter a calcareous productive formation to substitute for the drilling mud an acid, such as hydrochloric, capable of dissolving the formation, and to proceed with the drilling in the presence of the acid which is circulated in the usual manner until the desired depth of penetration of the producing formation is obtained. By substituting an acid solution for the conventional drilling mud while drilling through producing strata, the danger of "mudding off" or sealing the producing strata by penetration thereinto of clay mud particles is reduced, and instead the permeability of the formation may be increased by the action of the acid.

The above method of drilling, wherein an acid solution is circulated in the well bore during the drilling process, has certain disadvantages which prevent its being practically useful in many cases. For example, one serious disadvantage is that the acid readily penetrates into the upper portion of the formation first reached by the drill, thereby not only making the formation non-uniformly permeable, but also entailing an excessive loss of acid thereinto. This condition prevails because, as the drill progresses through the formation, the acid continues to pass out into the upper part of the formation where it initially entered. Thereafter, as the drill bit penetrates into the lower levels of the formation, additional quantities of acid do not readily enter these portions of the formation, since these offer a higher resistance to its passage than the upper part of the formation already made more permeable. Large volumes of acid are thus lost in the upper portions of the producing formation, while the lower portions are not materially benefited and as a consequence formations drilled through by this method are not rendered uniformly permeable, as is generally desired.

If the acid solution is not circulated in the well bore, but instead is allowed to merely stand in the bore while the drilling operation is being conducted, desirable results are not generally obtained, because the acid is not caused to penetrate into the formation, but instead spends itself in enlarging the bore hole without materially increasing the permeability of the producing formation. The above methods of drilling have a further serious disadvantage in that they cannot be used successfully when the well bore is cased with pipe down to an impervious stratum above the producing stratum and cemented therein with Portland cement grout. In such wells the circulation of acid up around the cemented casing causes the acid soluble cement to be disintegrated and washed away with the result that the casing must be recemented before the well can be produced. The circulation of acid upward in the well bore is undesirable even when the well is uncased, due to the fact that the acid may disintegrate the mud lining and enter a porous non-productive formation, spending itself therein ineffectively.

It is therefore an object of the invention to provide a method of drilling a well bore into or through acid soluble formations, whereby such formations may be readily drilled through and the permeability thereof increased substantially uniformly throughout.

Another object of the invention is to provide a method of drilling a well bore into or through an acid soluble formation, whereby the formation is not sealed or mudded off, but instead is rendered more permeable to the flow of fluids.

Another object of the invention is to provide a method of drilling in the presence of acids, whereby a well bore containing a cemented casing may be deepened without danger of the cement around the casing being disintegrated by the action of acid.

Still other objects and advantages of the invention will be apparent from the following description.

We have now found that the above objects may be attained and the foregoing difficulties largely overcome, if not entirely eliminated, by operating the drill in the presence of the acid, the level of which is controlled so as to be just above or approximately at the cutting head of the drill. This is accomplished by maintaining upon the acid in the bore a hydrostatic column of a substantially non-penetrating liquid mixture, preferably of a lower specific gravity than that of the acid. Sufficient pressure is applied to the acid which is introduced down the drill pipe to force any desired quantity of it into the formation at the level of the cutting head, whenever it may be in the course of the drilling, and as the drilling proceeds, additional amounts of the non-penetrating liquid mixture and acid are introduced into the well through the casing and drill pipe, respectively, to keep the well bore properly filled with each liquid to the desired level.

The term "non-penetrating liquid mixture" used herein and in the appended claims means a liquid mixture, such as an emulsion, or a dispersion in a liquid of a material which prevents the liquid from penetrating porous formations, such as those traversed by a well bore, but of sufficient fluidity to be introduced into the well and readily withdrawn therefrom.

The overlying non-productive earth or rock may be drilled through in the conventional manner, as by means of cable or rotary drilling tools, until the productive formation is reached, and thereafter the drilling is carried out according to the invention. It is preferable to use either the usual rotary drilling tools or suitable drilling means comprising a drilling bit attached to a hollow drill pipe through which the acid may be introduced to bring it into contact with the formation at the cutting head of the drill. Whether the usual rotary drilling tools or other similar drilling means be employed, there is introduced into the well through the casing or drill pipe a quantity of a non-penetrating liquid mixture and thereafter there is introduced into the well, preferably through the drill pipe, an acid solution. The acid, having a higher specific gravity than the non-penetrating liquid, remains at the bottom of the well bore. The amount of the non-penetrating liquid mixture to be used varies widely, it being necessary to use only enough to be assured of having that part of the well bore penetrating the acid-soluble producing formation filled with the non-penetrating mixture as the drilling proceeds. The remainder of the well bore above the level of the non-penetrating liquid is filled with oil or other suitable liquid and pressure applied thereto if necessary to regulate the level of the acid or to force it into the formation at the level of the head of the drill. If the amount of the non-penetrating liquid added when the drilling process was started is insufficient to drill through the producing formation according to the invention, additional amounts are added through the drill stem as the drilling progresses so as to keep the portion of the well bore penetrating the producing formation filled with the non-penetrating liquid mixture. If desired, the space in the bore outside the drill stem may be completely filled with the non-penetrating liquid, thus eliminating the necessity of adding more as the drilling progresses. During such drilling, acid is pumped down to the drill at such a rate as to maintain a supply of acid at the drill bit, as much of it being forced into the formation as appears to be desirable for increasing the permeability thereof.

The rate of introduction of acid into the formation is controlled so as to produce a uniformly permeable formation over the entire face of the producing formation as it becomes exposed by the drill. In general the drill bit is allowed to progress through the formation at a rate such that the acid substantially completely dissolves the cuttings being formed by the bit. Although any acid capable of dissolving and forming water-soluble salts with the constituents of the earth and rock formation may be used, we prefer to use a hydrochloric acid solution containing from about 5 to 25 per cent of hydrochloric acid, to which is added an inhibitor capable of preventing the corrosive action of the acid on metals. A generally useful concentration is about 15 per cent of hydrochloric acid by weight.

Among the non-penetrating liquid mixtures that are useful for maintaining a pressure head on the acid are those that have substantially the same or a lower specific gravity than that of the acid being used, and preferably not miscible therewith. One such mixture having suitable characteristics consists of an aqueous dispersion or solution of an organic jellifying material. The term "organic jellifying material" as used herein means an organic material capable of being dispersed or dissolved in water to make a mobile liquid mixture, which exhibits jellifying characteristics. A suitable material of this nature can be prepared from starches, such as those of cassava or rice, by mixing them with water to form a thin paste, and boiling the mixture until the starch is hydrolyzed. The cooked starch is dried at about 80° C. and the dried material ground, preferably to a fine powder. The powder so produced may be mixed with water in a concentration of from 1–8 per cent by weight. Such mixtures will withstand high pressures without penetrating porous earth or rock formations. Tests on cores secured from typical formations, said cores having been rendered relatively porous by acid treatment, have shown that pressures of several thousand pounds per square inch on such a mixture cause little or no penetration of it into the interstices of the cores.

Another type of non-penetrating liquid mixture that is suitable for use may be made by forming suitable emulsions, as for example, oil and water may be emulsified by passing them through a mixing head or homogenizer at a high rate of speed in conventional manner. Any of the well known emulsifying agents may be incorporated in the mixture to facilitate the forming of the emulsion. Such an emulsion may be made having any suitable consistency by varying the proportions of the ingredients.

Inorganic types of non-penetrating liquid mixtures may also be used to control the level of the acid while drilling. A suitable example of a generally useful mixture of this type is readily made by mixing bentonite with water in amounts up to 5%. Such a mixture is substantially non-penetrating and not readily miscible with the acid solution. Other liquid mixtures may be useful for the purpose described, providing they will not penetrate porous formations at relatively high pressures and can be made to flow readily in conventional well equipment. In some cases it may be desirable to use an amount of the non-penetrating liquid mixture which is just sufficient to fill the well bore to the depth to be drilled, the remainder of the hydrostatic column filling the well consisting of a drilling mud or similar material.

After the producing formation has been penetrated to the desired level by the forgoing method, the acid in the drill pipe may be forced into the formation by following it with a quantity of water or oil or displaced from the well at the casing head together with the non-penetrating liquid mixture by circulating oil or water down the drill pipe and allowing the liquids to escape at the casing head until the well is substantially clean. The water or oil may then be bailed, swabbed out of the well, or otherwise removed before the well is produced.

Among the advantages of the method are that acid soluble formations, when thus drilled through, are not sealed or mudded off by penetration of mud particles into the interstices of the formation and instead are open and porous, because the cutting head is operated in the presence of acid rather than drilling mud; that the acid is used more efficiently, a comparatively small amount sufficing to serve the purpose of aiding the drill bit in cutting through the formation and increasing its permeability to fluids; and that the producing formation is rendered uniformly permeable to fluids throughout the entire depth penetrated by the drill in the presence of the acid.

Although the method has been described with particular reference to drilling into or through oil or gas bearing formations, it is to be understood that the method need not be limited thereto, but may equally well be applied to drilling other types of wells, such as those to deliver water or brine.

Other modes of applying the principles of our invention may be employed instead of those explained, change being made as regards the method herein disclosed, provided the steps or steps stated by any of the following claims or the equivalent of such stated step or steps be employed.

We therefore particularly point out and distinctly claim as our invention:—

1. In a method of drilling a well bore in an acid-soluble formation, the steps which consist in operating a drill in the bottom of the bore in the presence of an acid solution, the said solution being maintained under the head of a column of a substantially non-penetrating liquid mixture and at a level above but near the working head of the drill.

2. In a method of drilling a well bore in an acid-soluble earth formation underlying an acid-insoluble formation, the steps which comprise drilling through the acid-insoluble formation in the presence of conventional drilling mud fluid, withdrawing said mud fluid from the well bore when the acid-soluble formation is reached, then operating a drill in the bottom of the bore in the presence of an acid solution capable of forming water soluble salts with constituents of the acid-soluble formation, and maintaining the said acid solution in the bore under the head of a column of a substantially non-penetrating liquid mixture having a lower specific gravity than that of the acid and at about the level of the cutting head of the drill.

3. In a method of drilling a well bore in an acid-soluble formation underlying an acid-insoluble formation, the steps which comprise drilling through the acid-insoluble formation in the presence of conventional drilling mud fluid, withdrawing said mud fluid from the well bore when the acid-soluble formation is reached, then operating the drill in the presence of a hydrochloric acid solution, the level of said solution in the bore being maintained just above the cutting head of the drill under the head of a column of a substantially non-penetrating liquid mixture having a lower specific gravity than that of the acid solution.

4. In a method of drilling a well bore into or through a calcareous formation with a rotary drill attached to a hollow drill pipe, the steps which consist in operating the drill in the bottom of the bore while supplying to the drill hydrochloric acid solution through the drill stem, introducing into the well through the casing a quantity of a non-penetrating liquid mixture in amount sufficient to maintain the level of the acid in the well bore at the cutting head of the drill.

5. In a method of drilling a well bore into or through an acid soluble formation with the usual rotary drilling tools, the steps which comprise filling the space in the well bore exterior of the drill stem with a non-penetrating liquid mixture, continually introducing acid solution into the well through the drill stem while operating the drill, and introducing into the well through the casing additional quantities of the non-penetrating liquid mixture as the drilling progresses, whereby the level of the acid solution in the bore is prevented from rising materially above the cutting head of the drill.

6. In a method of drilling a well bore into or through an acid soluble formation with the usual rotary drilling tools, the steps which comprise filling the space in the well bore surrounding the drill stem with an aqueous dispersion of an organic jellifying material, continually introducing acid solution into the well through the drill stem while operating the drill, and introducing into the well through the casing additional quantities of the organic jellifying material solution as the drilling progresses, whereby the level of the acid solution in the bore is prevented from rising materially above the cutting head of the drill.

7. In a method of drilling a well bore into or through an acid soluble formation with the usual rotary drilling tools, the steps which comprise filling the space in the well bore surrounding the drill stem with a substantially non-penetrating liquid emulsion, continually introducing acid solution into the well through the drill stem while operating the drill and introducing into the well through the casing additional quantities of the substantially non-penetrating liquid emulsion as the drilling progresses, whereby the level of the acid solution in the bore is prevented from rising materially above the cutting head of the drill.

8. In a method of drilling a well bore into or through an acid soluble formation with the usual rotary drilling tools, the steps which comprise filling the space in the well bore surrounding the drill stem with an inorganic non-penetrating liquid mixture, continually introducing acid solution into the well through the drill stem while operating the drill, and introducing into the well through the casing additional quantities of the inorganic non-penetrating liquid as the drilling progresses, whereby the level of the acid solution in the bore is prevented from rising materially above the cutting head of the drill.

9. In a method of drilling a well bore into or through an acid soluble formation with the usual rotary drilling tools, the steps which comprise filling the space in the well bore surrounding the drill stem with an aqueous dispersion of bentonite in water, continually introducing acid solution into the well through the drill stem while operating the drill, and introducing into the well through the casing additional quantities of the dispersion of bentonite in water as the drilling progresses, whereby the level of the acid solution in the bore is prevented from rising materially above the cutting head of the drill.

10. In a method of drilling a well bore into or through a calcareous formation with a rotary drill attached to a hollow drill pipe, the steps which consist in operating the drill in the bottom of the bore while supplying to the drill hydrochloric acid through the drill stem, and introducing into the well through the drill stem a quantity of a non-penetrating liquid mixture in amount sufficient to maintain the level of the acid in the well bore about at the cutting head of the drill.

JOHN J. GREBE.
LEONARD C. CHAMBERLAIN.